Figures 1, 2:
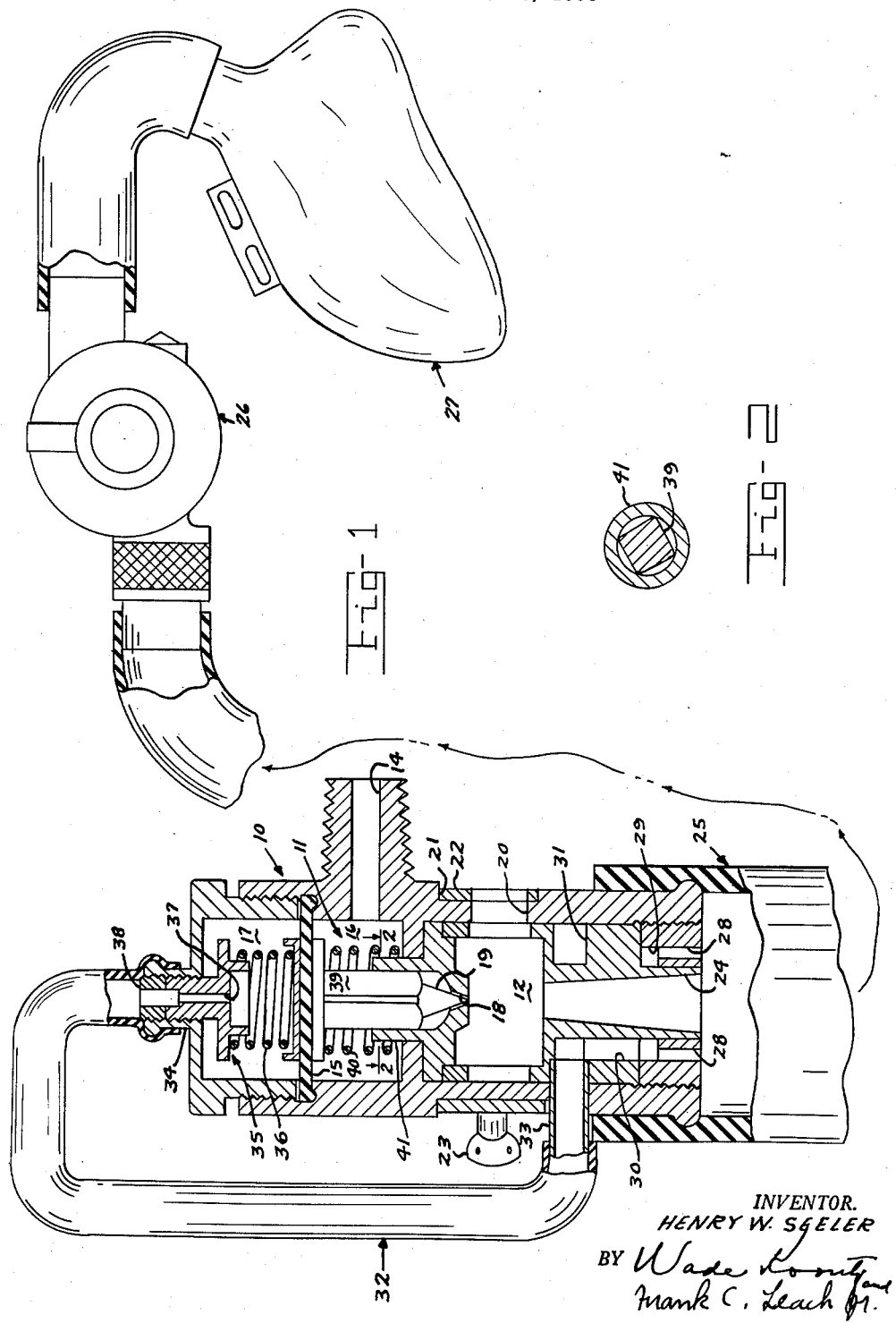

Aug. 4, 1959   H. W. SEELER   2,897,833
RESPIRATORY APPARATUS
Filed Feb. 14, 1956

INVENTOR.
HENRY W. SEELER
BY Wade Koontz
Frank C. Leach
ATTORNEYS

2,897,833

RESPIRATORY APPARATUS

Henry W. Seeler, Dayton, Ohio

Application February 14, 1956, Serial No. 565,515

8 Claims. (Cl. 137—64)

(Granted under Title 35, U.S. Code (1952), sec. 266)

The invention described herein may be manufactured and used by or for the United States Government for governmental purposes without payment to me of any royalties thereon.

This invention relates to respiratory apparatus and, more particularly, to a pressure controlled diluter valve for respiratory apparatus.

Respiratory apparatus such as resuscitators require a supply of fluid of constant pressure at all times. This supply is preferably at a pressure only slightly greater than atmospheric pressure in order for the resuscitator to function properly. While there are times when it is desired that the supply to the resuscitator be pure oxygen, a mixture of oxygen and air may be suitably employed at other times; of course, this mixture of oxygen and air reduces the expense of operating the resuscitator.

Previous fluid mixing devices, known as diluter valves, employed in respiratory devices have not supplied the mixed fluids of oxygen and air at a constant pressure. This has been due to the fact that as the ratio of the air to the oxygen increased, the pressure of the mixture correspondingly increased so that no constant pressure could be maintained.

The present invention satisfactorily solves this problem of supplying a fluid of constant pressure regardless of the ratio of the mixture of air with oxygen.

The primary object of the present invention is to provide a diluter valve for respiratory apparatus that maintains a constant pressure at its outlet regardless of the mixture ratio of oxygen and air.

Other objects of this invention will be readily perceived from the following description.

This invention relates to a diluter valve including a housing having a mixing chamber therein. An opening, which may be varied in size when desired, is provided in the mixing chamber for the admission of a fluid. Suitable means supply a second fluid under pressure to the mixing chamber to induce the first fluid through the opening into the mixing chamber from which the mixture flows into a container or the like. The housing has means to control the amount of the second fluid supplied to the mixing chamber to maintain a constant pressure in the container.

The attached drawing illustrates a preferred embodiment of the invention, in which Fig. 1 is a sectional view of the diluter valve of the present invention with a respiratory device connected thereto; and Fig. 2 is a sectional view taken on the line 2—2 of Fig. 1.

Referring to the drawing, there is shown a fluid mixing device, known as a diluter valve, having a housing 10. The housing 10 includes an inlet chamber 11 and a mixing chamber 12. The inlet chamber 11 has an inlet opening 14, which is connected to a suitable source (not shown) of oxygen or other fluid at a constant pressure. A diaphragm 15 in the inlet chamber 11 divides it into two portions 16 and 17. The lower portion 16 is in communication with the inlet opening 14 and also has an outlet opening or passage 18, which connects the inlet chamber 11 with the mixing chamber 12. A needle valve 19 controls the flow of oxygen or other fluid through the outlet opening 18.

The mixing chamber 12 has an opening 20 therein for the admission of a second fluid such as air into the mixing chamber. The housing 10 has a groove 21 in which is disposed an apertured adjustment ring 22 for varying the size of the opening 20 as desired. The adjustment ring 22 is actuated manually by moving a knob 23 thereon. Thus, the amount of fluid passage passing through the opening 20 into the mixing chamber 12 is varied by changing the position of the adjustment ring 22 with respect to the opening 20.

It will be noted that the air passing through the opening 20 is induced into the mixing chamber 12 by the oxygen flowing through the outlet opening 18 into the mixing chamber 12. This fluid mixture leaves the mixing chamber through a constricted passage 24 in the housing 10. The passage 24 diverges outwardly to increase the pressure of the mixture at the outlet of the passage 24 with respect to its pressure in the mixing chamber 12. A container 25 such as a hose is connected at one end to the housing 10. The container 25 serves as an outlet chamber for the fluid mixing device since the outlet of the passage 24 directs the mixture into this container or hose 25. While the container 25 has been shown as a hose that is connected to a resuscitator 26 such as shown and described in my Patent Number Re. 23,845, issued June 29, 1954, it will be understood that the container 25 could be any type of enclosed member that has an outlet, which will vent the fluid therein when desired. It is only necessary that some type of container, which is to be maintained at a specific constant pressure, be provided in order for the diluter valve of the present invention to perform satisfactorily. It will be further observed that the resuscitator 26 is connected to a mask 27 for application to the face of the person to be supplied the oxygen or mixture of oxygen and air through the resuscitator.

The pressure in the container 25 is transmitted to the upper portion 17 of the inlet chamber 11 through a first set of passages 28, an annular ring 29, a second set of passages 30, a second annular ring 31, and a tube 32. The tube 32 is connected to the second annular ring 31 by a flexible member 33. Thus, the pressure in the container acts on the upper surface of the diaphragm 15. The tube 32 is connected to an upstanding annular flange 34 on the housing 10. A member 35, which is threaded into the interior of the upstanding flange 34, has a spring 36 disposed between it and the upper surface of the diaphragm 15 to exert a downward force on the diaphragm 15. A passage 37 extends through the member 35 to permit the pressure of the mixed fluid to pass therethrough into the upper portion 17, which functions as a control chamber, of the inlet chamber 11. The exact force exerted by the spring 36 on the diaphragm 15 is determined by the position of the member 35, which is adjustably held in the upstanding flange 34 by a screw 38 that has a passage in alignment with the passage 37. The needle valve 19 is part of a valve member 39, which is attached to the lower surface of the diaphragm 15. A compression spring 40 is disposed between the upper flange of the valve member 39 and the base of the lower portion 16 of the inlet chamber 11 to resist downward movement of the diaphragm 15. However, the upward force of the compression spring 40 is resisted by the downward force of the spring 36 to maintain the diaphragm 15 in a substantially horizontal position in which the needle valve 19 closes the opening 18 when it is not subjected to pressure within the container 25.

As shown clearly in Fig. 2, the valve member 39 is substantially square shaped while a flange 41 extending upwardly from the base of the lower portion 16 is of annular cross section. This keeps the needle valve 19 in its center, but allows oxygen to flow through the outlet opening 18.

Considering the operation of the present invention, oxygen is supplied at a constant pressure from a suitable source (not shown) to the lower portion 16 of the inlet chamber 11 through the inlet opening 14. The pressure of this oxygen exerts a force on the diaphragm 15 that combines with the force of the compression spring 40 to overcome the downward force of the spring 36 and move the diaphragm upwardly; this raises the needle valve 19 to permit flow of oxygen through the outlet opening 18 into the mixing chamber 12. The needle valve 19 throttles the flow of the oxygen through the outlet opening 18 to reduce its pressure below atmospheric pressure when it enters the mixing chamber 12.

Since the pressure of the oxygen entering teh mixing chamber 12 is less than atmospheric pressure, the air at atmospheric pressure readily flows through the opening 20 in the mixing chamber 12 to mix with the oxygen passing rapidly therethrough. Since the passage 24 is in direct alignment with the outlet opening 18, the flow of oxygen is directly through the mixing chamber 12. As the mixture of oxygen and air passes through the passage 24, it increases in pressure due to the passage diverging whereby the pressure of the fluid mixture at the outlet of the passage 24 is slightly above atmospheric pressure when it enters the container 25. The exact pressure it is desired to maintain in the container 25 depends on a plurality of factors; however, the force of the spring 36 which is varied by moving the member 35 after removing the screw 38 from the flange 34, determines the exact pressure that is maintained in the container 25 because the spring's downward force changes the position of the diaphragm 15 to which the valve member 39 is connected.

The pressure in the container 25 is transmitted through the passages 28 and 30, the rings 29 and 31, and the tube 32 to the control chamber 17. As the pressure in the container 25 increases above the desired pressure, this results in an increased downward force on the diaphragm 15 to move the valve member 39 downwardly and thereby cause the needle valve 19 to reduce the flow of oxygen through the outlet opening 18. This reduces the pressure since the amount of air passing through the opening 20 is also decreased proportionately. If the pressure in the container 25 decreases below the desired pressure, the compression spring 40 along with the pressure of the oxygen in the lower portion 16 of the inlet chamber 11 moves the diaphragm 15 upwardly due to a decrease in the downward force on the diaphragm to further open the outlet opening 18 and allow more oxygen to enter the mixing chamber 12. This increases the pressure in the container 25 since the quantity of air flowing through the opening 20 also increases proportionately.

The adjustment ring 22 is moved when it is desired to change the ratio of the air with respect to the oxygen. If the ratio of the air is increased, the combined pressure of the fluid mixture entering the container 25 rises and this increase in pressure is transmitted to the control chamber 17 where it exerts a larger downward force on the diaphragm 15 to move the needle valve 19 towards its closed position to decrease the flow of oxygen through the outlet opening 18. Obviously, when the flow of oxygen to the mixing chamber decreases, there is a reduction in the amount of air induced through the opening 20 into the mixing chamber 12. This, of course, lowers the pressure entering the container 25 from the mixing chamber 12.

After conditions have been stabilized with this ratio of oxygen and air, it may then be desired to decrease the amount of air entering the mixing chamber 12 by reducing the size of the opening 20 to lower the ratio of air to oxygen. This reduction produces a lower pressure in the container 25, which is transmitted to the control chamber 17. This decreases the downward force on the diaphragm 15 whereby the needle valve allows flow of more oxygen through the outlet opening 18 into the mixing chamber 12. This increases the flow of oxygen through the mixing chamber and also increases the amount of air flowing through the opening 20 in the mixing chamber 12 even though the ratio has been reduced.

Thus, it will be easily seen that the present fluid mixing device permits the ratio of air to oxygen to be varied as desired without varying the pressure in the container. Therefore, the present invention maintains a constant pressure in a fluid container even though the ratio of oxygen to air is varied when desired. While reference has been made primarily to oxygen and air as the fluids flowing through the mixing chamber 12, it will be readily understood that any other fluids may be employed where it is desired to mix fluids and maintain the fluid mixture at a constant pressure.

An advantage of this invention is that it reduces the operating expense of a respiratory device of the type requiring a source of constant pressure.

For purposes of exemplification, a particular embodiment of the invention has been shown and described according to the best present understanding thereof. However, it will be apparent that changes and modifications in the arrangement and construction of the parts thereof may be resorted to without departing from the true spirit and scope of the invention.

I claim:

1. A fluid mixing device including a housing, said housing having an inlet chamber and a mixing chamber therein, said mixing chamber having an opening therein for admission of a fluid, means to vary the size of said opening, inlet means to supply a second fluid having a constant pressure to said inlet chamber, valve-controlled outlet means in said inlet chamber directing flow of said second fluid through the mixing chamber at a pressure below atmospheric pressure to induce flow of the first fluid through the opening into the mixing chamber, outwardly diverging passage means to conduct the mixed fluid from the mixing chamber to a container at a pressure above atmospheric pressure, said inlet chamber having a diaphragm therein positioned above the inlet means of said inlet chamber to form an upper and a lower chamber portion sealed from each other in communication with opposite sides of said diaphragm and controlling the flow of said second fluid through said outlet means, and pressure fluid transfer means in communication between said upper chamber portion and the interior of said container to transmit the pressure in said container to the upper surface of said diaphragm to increase or decrease the flow of said second fluid through said valve-controlled outlet means and the proportional flow of said first fluid induced thereby through said opening to mix therewith on any change of pressure in the container and thereby maintain a substantially constant pressure in the container for any altitude.

2. A diluter including a housing, said housing having an inlet chamber and a mixing chamber, and a diaphragm positioned within said inlet chamber to divide said inlet chamber into an upper and a lower compartment, said lower compartment having an inlet opening adapted to supply fluid under constant pressure to said inlet chamber, said housing having an outlet passage connecting said inlet chamber with said mixing chamber, a needle valve cooperating with said passage to control the flow of fluid delivered under constant pressure to said inlet chamber from said inlet chamber to said mixing chamber, inlet means to supply a second fluid to said mixing chamber to mix with said first fluid therein, means connecting said mixing chamber with a container, means to actuate the valve to vary the flow of fluid through said passage from said inlet chamber to said mixing chamber to maintain a constant pressure in the container for any altitude, said last-named means comprising a relatively elongated member interconnecting said needle valve and the lower surface of said diaphragm and a hollow tube member in communication between the container and said diaphragm remote from the connection of said diaphragm to said needle valve to transmit any changes in pressure in the container to the upper surface of said diaphragm and automatically compensate for said pressure changes, said passage being constricted to reduce the pressure of the constant pressure fluid flowing into said mixing chamber from said inlet chamber below the pressure of said second fluid to induce the flow of said second fluid into said mixing chamber in accordance therewith, and means to vary the amount of the second fluid supplied to the mixing chamber comprising a ring-shaped member mounted in a groove in said housing in circumferential relation to the supply means of said second fluid and adjustable to regulate the flow thereof into said mixing chamber.

3. A fluid mixing device including a housing, said housing having an inlet chamber having an inlet opening adapted to receive a first supply of fluid at a constant pressure thereinto and a mixing chamber in communication therewith, said mixing chamber having an opening therein for admission of a second fluid under pressure, means to vary the size of said opening, means to deliver said first fluid from the inlet chamber to the mixing chamber to induce flow of the second fluid into the mixing chamber, means to conduct the mixed fluid from the mixing chamber into a container, and means to maintain a substantially constant pressure in the container at any altitude by varying the amount of the first fluid supplied from the inlet chamber into the mixing chamber, said second-named means comprising a restricted outlet opening in communication between said inlet chamber and said mixing chamber and needle valve means controlling the supply of said second fluid through said outlet opening, said last-named means comprising a resiliently mounted flexible plate means positioned intermediately above the inlet opening of said inlet chamber in rigid connection to said needle valve means and dividing said inlet chamber into upper and lower chamber portions and interconnecting fluid passage means in communication between said container and the upper chamber portion and the upper surface of said resiliently mounted flexible plate means to control the adjustment of said needle valve means in said outlet opening in accordance with a change in pressure in said container to maintain a constant pressure therein.

4. A fluid mixing device having a housing and including an inlet chamber having an inlet adapted to deliver fluid under constant pressure therein, a mixing chamber and an outlet chamber, a fluid container under pressure connected to said housing, said mixing chamber having an opening therein for the admission of fluid under relatively high pressure, means to vary the size of said opening, means to supply a second fluid from the inlet chamber to the mixing chamber under relatively low pressure to induce flow of the first fluid through the opening into the mixing chamber, outwardly divergent outlet means to direct the fluid mixture from the mixing chamber to the outlet chamber under a predetermined relatively high pressure, and means to change the amount of the second fluid supplied to the mixing chamber and maintain said predetermined pressure constant in the outlet chamber comprising valve means controlling flow of said second fluid into said mixing chamber, pressure responsive means positioned within said inlet chamber above said inlet and having a compartment in contact with the upper surface thereof in communication between said container and said valve means responsive to changes in pressure above or below the predetermined pressure in said container to control the position of said valve means relative to said outlet means and including pressure-delivering passage means in communication between the compartment and said container.

5. In combination, a diluter including a housing, said housing having an inlet chamber with an inlet opening adapted to deliver a supply of a first fluid under constant pressure thereinto and a mixing chamber, a fluid container under pressure connected to said housing, said mixing chamber having an opening therein for admission of a second fluid, means to vary the size of said opening, means including an outlet opening to supply said first fluid from said inlet chamber to said mixing chamber to induce flow of the second fluid through the opening into the mixing chamber, means connecting the mixing chamber with the container including an outwardly flared passage directing the flow of mixed fluid from the mixing chamber to the container with an increase in pressure, and means to vary the amount of said first fluid supplied to said mixing chamber and maintain a predetermined constant pressure in the container comprising a diaphragm dividing said inlet chamber into an upper chamber portion and a lower chamber portion in communication with said inlet opening, said outlet opening communicating with and directing said first fluid into said mixing chamber, a needle valve positioned within said lower chamber portion controlling the amount of flow of said first fluid through said outlet opening, a needle valve member interconnecting said needle valve with the lower surface of said diaphragm, a first spring surrounding said needle valve member applying a force on said diaphragm tending to open said valve, a second spring positioned in said upper chamber portion applying an opposite force on said diaphragm tending to close said valve, and interconnecting fluid passages between the upper surface of said diaphragm and said container transmitting the pressure in said container to the upper surface of said diphragm to move said diaphragm in one direction or the other to subsequently reduce or increase the pressure in said container on initial variation from said predetermined constant pressure.

6. A fluid mixing device including an inlet chamber having an inlet opening adapted to receive a first fluid under constant pressure therein and a flexible member positioned transversely relative to said inlet chamber above the inlet opening thereof and dividing said inlet chamber into an upper and a lower portion on opposite sides thereof, a mixing chamber and an outlet chamber, said mixing chamber having an opening therein for admission of a second fluid under pressure, means to vary the size of said opening, means to supply the first fluid admitted under constant pressure into the lower portion of said inlet chamber to the mixing chamber under reduced pressure to induce flow of the second fluid through the opening into the mixing chamber including a restricted passage under control of a valve, means to direct the fluid mixture from the mixing chamber to the outlet chamber under increased pressure, means connecting the upper portion of said inlet chamber with the outlet chamber to transmit the pressure in the outlet chamber to the flexible member in said upper portion, and interconnecting means attached between said flexible member within said lower portion and said valve member movable by the pressure transmitted to the upper portion to control the flow of said second fluid into said mixing chamber and maintain a substantially constant pressure in the outlet chamber.

7. A fluid mixing device for supplying a fluid at constant pressure including a housing having an inlet chamber and a mixing chamber with an opening therein to connect said mixing chamber with a source of a first fluid under relatively high pressure, inlet means adapted to supply a second fluid at a predetermined constant pressure to said inlet chamber, valve means directing a supply of said constant pressure second fluid through said mixing chamber at a relatively reduced pressure to induce flow of the first fluid through said opening to mix with said second fluid, constricted passage means connecting the mixing chamber with a container to direct the mixed fluid into the said container, means insuring a predetermined substantially constant pressure in the container comprising a flexible, valve-operating member in engagement with said valve means positioned in transverse position to said inlet chamber dividing said inlet chamber into an upper portion communicating with the upper surface of said flexible, valve-operating member and a lower portion in communication with said valve means and automatically movable between a valve-closing and a valve-opening position to vary the flow of the second fluid into said mixing chamber and the flow of the first fluid induced thereinto by said second fluid and passage-communicating means between the container and said valve member automatically transmitting any changes in the pressure in the container to said flexible, valve-operating member to automatically move said valve member between valve-opening and valve-closing positions to maintain said predetermined constant pressure in the container, and means for varying the size of the opening in said mixing chamber comprising an apertured adjustment ring mounted in said housing in surrounding relation to said opening and an adjustment control for changing the position of said ring.

8. A fluid mixing device including an inlet chamber, a mixing chamber, and an outlet chamber, said mixing chamber having an opening therein for the admission of a first fluid under pressure, means to vary the size of said opening, inlet means to supply a second fluid having a constant pressure to the inlet chamber, passage means directing flow of the second fluid from the inlet chamber under reduced pressure relative to said first fluid to the mixing chamber to induce flow of said first fluid through the opening into the mixing chamber, outlet means to direct the fluid mixture from the mixing chamber under increased pressure to the outlet chamber, and means to maintain a constant pressure in the outlet chamber regardless of variations in pressure of said first fluid comprising a valve positioned in said passage means controlling the flow of said second fluid therethrough, a relatively thin partition extending transversely of said inlet chamber above said inlet means attached at its lower surface to said valve and normally movable with said valve away from said passage means under constant pressure of said second fluid, and fluid pressure means between said outlet chamber and the upper surface of said partition transmitting the pressure therein to move said valve relative to said passage means on any change of the pressure in said outlet chamber.

References Cited in the file of this patent

UNITED STATES PATENTS

| | | |
|---|---|---|
| 1,172,765 | Carroll | Feb. 22, 1916 |
| 1,933,733 | Hess | Nov. 7, 1933 |
| 2,269,500 | Wildhack | Jan. 13, 1942 |
| 2,630,129 | Holmes | Mar. 3, 1953 |
| 2,767,727 | Acomb | Oct. 23, 1956 |
| 2,774,352 | Emerson | Dec. 18, 1956 |